(12) United States Patent
Jun

(10) Patent No.: US 10,694,178 B2
(45) Date of Patent: Jun. 23, 2020

(54) VIDEO PROCESSING DEVICE FOR ENCODING FRAMES CONSTITUTING HIERARCHICAL STRUCTURE

(71) Applicant: Samsung Electronics Co., Ltd., Suwon-si, Gyeonggi-do (KR)

(72) Inventor: Sung-ho Jun, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 142 days.

(21) Appl. No.: 15/704,716

(22) Filed: Sep. 14, 2017

(65) Prior Publication Data

US 2018/0139439 A1 May 17, 2018

(30) Foreign Application Priority Data

Nov. 11, 2016 (KR) .................. 10-2016-0150333

(51) Int. Cl.
*H04N 19/103* (2014.01)
*H04N 19/192* (2014.01)
(Continued)

(52) U.S. Cl.
CPC ......... *H04N 19/103* (2014.11); *H04N 19/115* (2014.11); *H04N 19/157* (2014.11); *H04N 19/172* (2014.11); *H04N 19/174* (2014.11); *H04N 19/184* (2014.11); *H04N 19/187* (2014.11); *H04N 19/192* (2014.11);
(Continued)

(58) Field of Classification Search
CPC .... H04N 19/117; H04N 19/85; H04N 19/107; H04N 19/109; H04N 19/114; H04N 19/177; H04N 19/31; H04N 19/34; H04N 19/103; H04N 19/157; H04N 19/159;
(Continued)

(56) References Cited

U.S. PATENT DOCUMENTS 6,275,614 B1 8/2001 Krishnamurthy et al.
8,428,127 B2 4/2013 Nie et al.
(Continued)

FOREIGN PATENT DOCUMENTS

JP 2005-303362 A 10/2005
JP 2007-318617 A 12/2007

OTHER PUBLICATIONS

K.Y. Min, W. Lim, J. Nam, D. Sim & I.V. Bajić, "Distributed video coding supporting hierarchical GOP structures with transmitted motion vectors", 12 Eurasip J. on Image and Video Processing (2015) (Year: 2015).*

(Continued)

*Primary Examiner* — David N Werner
(74) *Attorney, Agent, or Firm* — Harness, Dickey & Pierce, P.L.C.

(57) ABSTRACT

A video processing device configured to encode frames divided into a plurality of layers according to a prediction type includes a pre-processing circuit configured to, generate a mode analysis result by analyzing mode information for each of N neighboring frames neighboring a target frame, and determine a target layer bit numbers allocated to each of the plurality of layers based on the mode analysis result, N being an integer equal to or greater than 2; and a first encoder configured to encode the target frame according to the determined target layer bit numbers.

20 Claims, 12 Drawing Sheets

(51) Int. Cl.
*H04N 19/115* (2014.01)
*H04N 19/172* (2014.01)
*H04N 19/187* (2014.01)
*H04N 19/157* (2014.01)
*H04N 19/174* (2014.01)
*H04N 19/184* (2014.01)
*H04N 19/30* (2014.01)
*H04N 19/105* (2014.01)
*H04N 19/107* (2014.01)

(52) U.S. Cl.
CPC ........... *H04N 19/30* (2014.11); *H04N 19/105* (2014.11); *H04N 19/107* (2014.11)

(58) Field of Classification Search
CPC ........... H04N 19/36; H04N 19/172105; H04N 19/30; H04N 19/105
See application file for complete search history.

(56) References Cited

U.S. PATENT DOCUMENTS

| | | | | |
|---|---|---|---|---|
| 2002/0001411 | A1* | 1/2002 | Suzuki | H04N 19/52 |
| | | | | 382/238 |
| 2003/0206589 | A1* | 11/2003 | Jeon | H04N 19/117 |
| | | | | 375/240.15 |
| 2006/0133484 | A1* | 6/2006 | Park | H04N 19/105 |
| | | | | 375/240.08 |
| 2007/0109409 | A1* | 5/2007 | Yea | H04N 7/181 |
| | | | | 348/153 |
| 2007/0160129 | A1* | 7/2007 | Fujisawa | H04N 19/159 |
| | | | | 375/240 |
| 2009/0161768 | A1* | 6/2009 | Park | H04N 19/172 |
| | | | | 375/240.24 |
| 2010/0111163 | A1 | 5/2010 | Yang et al. | |
| 2013/0195176 | A1 | 8/2013 | Song et al. | |
| 2013/0322524 | A1 | 12/2013 | Jang et al. | |
| 2014/0241421 | A1* | 8/2014 | Orton-Jay | H04N 19/105 |
| | | | | 375/240.03 |
| 2014/0241433 | A1* | 8/2014 | Bosse | H04N 19/463 |
| | | | | 375/240.16 |
| 2014/0247873 | A1* | 9/2014 | Bosse | H04N 19/52 |
| | | | | 375/240.12 |
| 2014/0328390 | A1 | 11/2014 | Jang et al. | |
| 2015/0189271 | A1* | 7/2015 | Wu | H04N 19/176 |
| | | | | 375/240.02 |
| 2016/0212421 | A1* | 7/2016 | Muthu | H04N 19/176 |
| 2019/0028732 | A1* | 1/2019 | Takano | H04N 19/186 |
| 2019/0098330 | A1* | 3/2019 | Omori | H04N 19/51 |

OTHER PUBLICATIONS

H.W. Chen, C.H. Yeh, M.Ch. Chi, C.T. Hsu, M.J. Chen, "Adaptive GOP structure determination in hierarchical B picture coding for the extension of H.264/AVC", 2008 Int'l Conf. on Communications, Circuits, & Systems (May 2008) (Year: 2008).*

B. Zatt, M. Porot, J. Scharcanski, & S. Bampi, "GOP Structure Adaptive to the Video Content for Efficient H.264/AVC Encoding" Sep. 2010) (Year: 2010).*

W.G. Chen & X. Wang, "Fast entropy-based CABAC rate estimation for mode decision in HEVC", 5 SpringerPlus 756 (Jun. 17, 2016) (Year: 2016).*

* cited by examiner

FIG. 9

| | R_Intra ≤ 5 | 5 < R_Intra ≤ 15 | 15 < R_Intra ≤ 20 | 20 < R_Intra ≤ 35 | R_Intra ≤ 35 |
|---|---|---|---|---|---|
| R_Skip < 40 | LBR0 = 0.85<br>LBR1 = 0.10<br>LBR2 = 0.05 | LBR0 = 0.80<br>LBR1 = 0.15<br>LBR2 = 0.05 | LBR0 = 0.75<br>LBR1 = 0.15<br>LBR2 = 0.10 | LBR0 = 0.70<br>LBR1 = 0.20<br>LBR2 = 0.10 | LBR0 = 0.65<br>LBR1 = 0.20<br>LBR2 = 0.15 |
| R_Skip ≥ 40 | LBR0 = 0.90<br>LBR1 = 0.05<br>LBR2 = 0.05 | LBR0 = 0.85<br>LBR1 = 0.10<br>LBR2 = 0.05 | LBR0 = 0.80<br>LBR1 = 0.15<br>LBR2 = 0.05 | LBR0 = 0.75<br>LBR1 = 0.15<br>LBR2 = 0.10 | LBR0 = 0.70<br>LBR1 = 0.20<br>LBR2 = 0.10 |

| R_Skip ≤ 10 | 10 < R_Skip ≤ 20 | 20 < R_Skip ≤ 30 | 30 < R_Skip ≤ 40 | R_Skip ≤ 40 |
|---|---|---|---|---|
| LBR0 = 0.65<br>LBR1 = 0.20<br>LBR2 = 0.15 | LBR0 = 0.70<br>LBR1 = 0.20<br>LBR2 = 0.10 | LBR0 = 0.75<br>LBR1 = 0.15<br>LBR2 = 0.10 | LBR0 = 0.80<br>LBR1 = 0.15<br>LBR2 = 0.05 | LBR0 = 0.85<br>LBR1 = 0.10<br>LBR2 = 0.05 |

VIDEO PROCESSING DEVICE FOR ENCODING FRAMES CONSTITUTING HIERARCHICAL STRUCTURE

CROSS-REFERENCE TO RELATED APPLICATION

This application claims priority under 35 U.S.C. § 119 to Korean Patent Application No. 10-2016-0150333, filed on Nov. 11, 2016, in the Korean Intellectual Property Office, the disclosure of which is incorporated herein in its entirety by reference.

BACKGROUND

Field

At least some example embodiments of the inventive concepts relate to a video processing device, and more particularly, to a video signal processing device that encodes frames or a group of pictures (GOP) constituting a hierarchical structure.

Related Art

With the development and dissemination of hardware capable of reproducing and storing high-resolution or high-definition video content, there is a growing need for a video processing device that effectively encodes or decodes high-resolution or high-definition video content. According to an existing video processing device, encoding is performed using a hierarchical structure in which layers are divided based on a reference for prediction.

SUMMARY

At least some example embodiments of the inventive concepts provide a video processing device with improved performance by reducing the degradation of image characteristics according to encoding and increasing the efficiency of transmission on limited channels.

According to at least some example embodiments of the inventive concepts, a video processing device configured to encode frames divided into a plurality of layers according to a prediction type includes a pre-processing circuit configured to, generate a mode analysis result by analyzing mode information for each of N neighboring frames neighboring a target frame, and determine target layer bit numbers allocated to each of the plurality of layers based on the mode analysis result, N being an integer equal to or greater than 2; and a first encoder configured to encode the target frame according to the determined target layer bit numbers.

According to at least some example embodiments of the inventive concepts, a video processing device configured to encode frames divided into a plurality of layers according to a prediction type includes a pre-processing circuit configured to, generate a mode analysis result by analyzing mode information for a frame group comprising M frames from among a plurality of frames, and determine target layer bit numbers allocated to each of the plurality of layers based on a mode analysis result, M being an integer equal to or greater than 2; and a first encoder configured to sequentially encode the frame group according to the determined target layer bit numbers.

According to at least some example embodiments of the inventive concepts, a video encoder includes a pre-processing circuit configured to, determine a plurality of encoding modes corresponding to a plurality of frames, respectively, the plurality of frames temporally neighboring a target frame, generate a mode analysis result based on the determined plurality of encoding modes, and determine target layer bit numbers for each of a plurality of layers into which the plurality of temporally neighboring frames are divided, based on the mode analysis result; and an encoder configured to encode the target frame based on the determined target layer bit numbers.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIGS. 9 and 10 are bit lookup tables according to at least some example embodiments of the inventive concepts;

FIG. 11 is a block diagram of a bit number calculator and a bitrate changer according to at least some example embodiments of the inventive concepts;

DETAILED DESCRIPIION OF THE EMBODIMENTS

Figure 1:
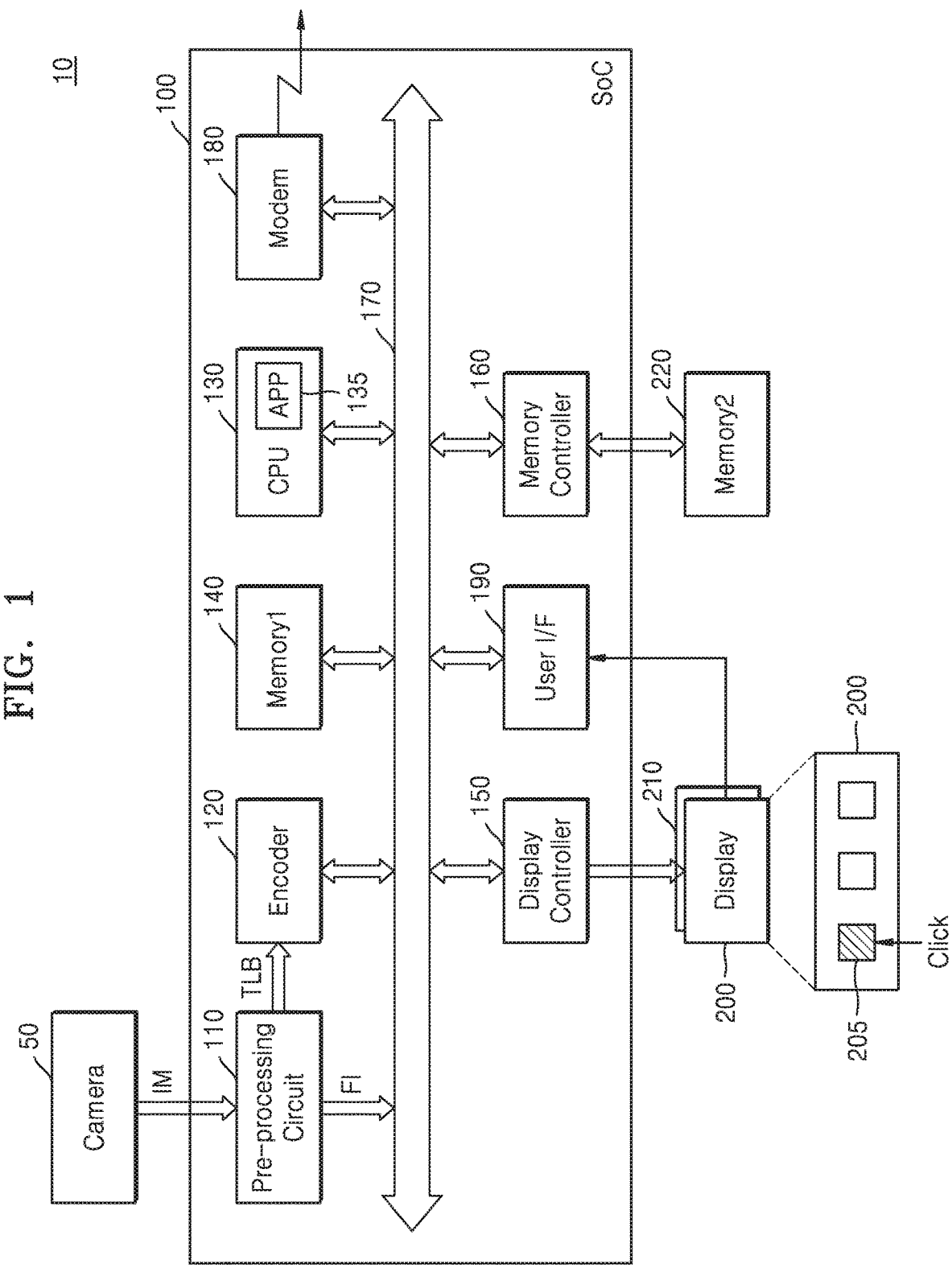
FIG. 1 is a block diagram of a video processing system according to at least some example embodiments of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a block diagram of a video processing system according to at least some example embodiments of the inventive concepts.

Referring to FIG. 1, a video processing system 10 may include a camera 50, a system on chip (SoC) 100, a display 200, an input device 210, and a second memory 220. The video processing system 10 may be any of various devices capable of processing 2D and 3D graphics data and displaying the processed data. Although FIG. 1 shows that the second memory 220 is outside the SoC 100, the second memory 220 may be implemented in the SoC 100 according to at least one example embodiment of the inventive concepts.

Examples of the types of devices that may embody the video processing system 10 include, but are not limited to, a television (TV), a digital TV, an Internet protocol TV (IPTV), a personal computer (PC), a desktop computer, a lap-top computer, a computer workstation, a tablet PC, a video game platform (or video game console), a server, or a mobile computing device. Examples of the mobile computing device include, but are not limited to, a mobile phone, a smart phone, a personal digital assistant (PDA), an enterprise digital assistant (EDA), a digital still camera, a digital video camera, a portable multimedia player (PMP), a personal navigation device or a portable navigation device (PND), a mobile Internet device (MID), a wearable computer, an Internet of things (IoT) device, an Internet of everything (IoE) device, or an e-book.

The camera 50 may include, for example, a complementary metal oxide semiconductor (CMOS) image sensor of a charge-coupled device (CCD) image sensor. The camera 50 may photograph a subject, generate first data IM for the subject, and output the generated first data IM to the SoC 100. The first data IM may be, for example, still image data or moving image data.

The SoC 100 may generally control the operation of the video processing system 10. According to at least some example embodiments of the inventive concepts, the SoC 100 may be or include an integrated circuit (IC), a motherboard, an application processor (AP), and/or a mobile AP capable of performing operations according to at least some example embodiments of the inventive concepts as described herein. In other words, the SoC 100 may process the first data IM output from the camera 50, and perform any or all of displaying the processed data on the display 200, storing the processed data in the second memory 220, and transmitting the processed data to another video processing system. The data IM output from the camera 50 may be transmitted to a pre-processing circuit 110 via a MIPI® camera serial interface (CSI).

The SoC 100 may include the pre-processing circuit 110, an encoder 120, a central processing unit (CPU) 130, a first memory 140, a display controller 150, a memory controller 160, a bus 170, a modem 180, and a user interface 190. The pre-processing circuit 110, the encoder 120, the CPU 130, the first memory 140, the display controller 150, the memory controller 160, the modem 180, and the user interface 190 may exchange data with one another via the bus 170. For example, the bus 170 may be implemented as a Peripheral Component Interconnect Bus (PCI) bus, a PCI Express (PCIe) bus, an Advanced High Performance Bus (AMBA), an Advanced High Performance Bus (AHB), an Advanced Extensible Interface (AXI) bus, or a combination thereof, but is not limited thereto. According to at least some example embodiments of the inventive concepts, any or all of the encoder 120, display controller 150, memory controller 160, and modem 180 may be embodied by circuits or circuitry, program code executed by a processor (e.g., the CPU 130), or a combination of circuits or circuitry and program code executed by the processor.

The pre-processing circuit 110 may receive the first data IM output from the camera 50, may process the received first data IM, and may output the second data FI generated according to the processing result to the encoder 120. For example, the pre-processing circuit 110 may transmit the second data FI generated according to the processing result to the encoder 120 via the bus 170 or directly (not shown). According to at least one example embodiment of the inventive concepts, the pre-processing circuit 110 may be implemented as an image signal processor (ISP). Although FIG. 1 shows that the pre-processing circuit 110 is implemented in the SoC 100, the pre-processing circuit 110 may be implemented outside the SoC 100, according to at least some example embodiments of the inventive concepts. According to at least one example embodiment of the inventive concepts, the pre-processing circuit 110 may output a target layer bit number TLB to the encoder 120 via the bus 170 or directly. A detailed description will be provided at a later time with respect to FIG. 3 or the like.

The encoder 120 may encode each of a plurality of frames or blocks included in the second data FI. Although the encoder 120 is shown in FIG. 1, a codec may function as the encoder 120. The encoding operation performed by the encoder 120 may use an image data encoding technique of a joint picture expert group (JPEG), motion picture expert groups (MPEG), MPEG-2, MPEG-4, VC-1, H.264, H.265, or High Efficiency Video Coding (HEVC), but at least some example embodiments of the inventive concepts are not limited thereto. FIG. 1 shows the encoder 120 as a hardware encoder, but the encoder 120 according to at least some example embodiments of the inventive concepts may be implemented as a hardware encoder or a software encoder. The software encoder may be embodied as program code that is stored in a memory of the video processing system 10 (e.g., the first or second memory 140 or 220) and executed by a processor of the video processing system 10 (e.g., the CPU 130). Although FIG. 1 shows that the pre-processing circuit 110 and the encoder 120 are included in the SoC 100, at least some example embodiments of the inventive concepts are not limited thereto. Any video processing device included in any device may be used as long as the video processing device receives and encodes video data. The encoder 120 according to at least some example embodiments of the inventive concepts may receive the target layer bit number TLB from the pre-processing circuit 110 and may perform encoding according to a target layer bit number TLB for each layer corresponding to the received target layer bit number TLB.

The CPU 130 may control the operation of the SoC 100. A user may provide an input to the SoC 100 such that the CPU 130 may execute one or more applications (e.g., the software applications (APP) 135). According to at least one example embodiment of the inventive concepts, the applications 135 executed by the CPU 130 may include one or more video call applications. Examples of additional types of applications that may be included in the applications 135 executed by the CPU 130 include, but are not limited to, an operating system (OS), a word processor application, a media player application, a video game application, and/or a graphical user interface (GUI) application.

The first memory 140 may receive and store data encoded by the encoder 120 as at least one of the applications 135 is executed. Furthermore, the first memory 140 may transmit data stored by at least one of the applications 135 to the CPU 130 or the modem 180. The first memory 140 may write data for at least one of the applications 135 executed in the CPU 130 and may read data for at least one of the applications 135 stored in the first memory 140. For example, the first memory 140 may be implemented as a volatile memory (e.g., static random access memory (SRAM), dynamic RAM (DRAM), synchronous DRAM (SDRAM), etc.) or a non-volatile memory (e.g., read only memory (ROM), flash memory, NAND flash memory, etc.).

The display controller 150 may transmit data output from the encoder 120 or the CPU 130 to the display 200. Examples of devices that may embody the display 200 include, but are not limited to, a monitor, a TV monitor, a projection device, a liquid crystal display (LCD), a thin film transistor-liquid crystal display (TFT-LCD), a light emitting diode (LED) display, an organic LED (OLED) display, or a flexible display. For example, the display controller 150 may transmit data to the display 200 via a MIPI® display serial interface (DSI).

The input device 210 may receive a user input from a user, and may transmit an input signal corresponding to the user input to the user interface 190. Examples of devices that may embody the input device 210 include, but are not limited to, a touch panel, a touch screen, a voice recognizer, a touch pen, a keyboard, a mouse, a track point, and the like. For example, when the input device 210 is a touch screen, the input device 210 may include a touch panel and a touch panel controller. Furthermore, when the input device 210 is a voice recognizer, the input device 210 may include a voice recognition sensor and a voice recognition controller.

The input device 210 may be connected to or separated from the display 200. According to at least one example embodiment of the inventive concepts, when a user executes an application icon 205 displayed on the display 200 using the input device 210, the input device 210 may generate an input signal. The application icon 205 may be generated by at least one of the applications 135 that may be executed by the CPU 130. The display 200 may display a plurality of application icons. For example, when at least one of the applications 135 is a video call application, the application icon 205 may be an icon for executing the video call application.

The input device 210 may transmit an input signal to the user interface 190. The user interface 190 may receive the input signal from the input device 210 and may transmit data corresponding to the input signal to the CPU 130. According to at least one example embodiment of the inventive concepts, the CPU 130 may receive data corresponding to the input signal and may execute at least one of the applications 135 in response to the data.

The memory controller 160 may read data stored in the second memory 220 and transmit the read data to the encoder 120 or the CPU 130 under the control of the encoder 120 or the CPU 130. Also, the memory controller 160 may write data output from the encoder 120 or the CPU 130 to the second memory 220 under the control of the encoder 120 or the CPU 130.

The second memory 220 may be a volatile memory and/or a non-volatile memory. Examples of the types of volatile memory the second memory 220 may be include, but are not limited to, random access memory (RAM), static RAM (SRAM), dynamic RAM (DRAM), synchronous DRAM (SDRAM), thyristor RAM (T-RAM), zero capacitor RAM (Z-RAM), or twin transistor RAM (TTRAM). The non-volatile memory may be an electrically erasable programmable read-only memory (EEPROM), a flash memory, magnetic RAM (MRAM), spin-transfer torque MRAM, ferroelectric RAM (FeRAM), phase change RAM (PRAM), or resistive RAM (RRAM). Furthermore, examples of the types of non-volatile memory the second memory 220 may be include, but are not limited to, a multimedia card (MMC), an embedded MMC (eMMC), a universal flash storage (UFS), a solid state drive or a solid state disk (SSD), a universal serial bus (USB) flash drive, or a hard disk drive (HDD).

The modem 180 may output data encoded by the encoder 120 or the CPU 130 to the outside using wired or wireless communication technology. Examples of the wireless communication technology the modem 180 may use include, but are not limited to, may be Wireless-Fidelity (Wi-Fi), Wireless Broadband Internet (WIBRO), 3G wireless communications, long term evolution (LTETM), long term evolution-advanced (LTE-A), or broadband LTE-A.

Figure 2:
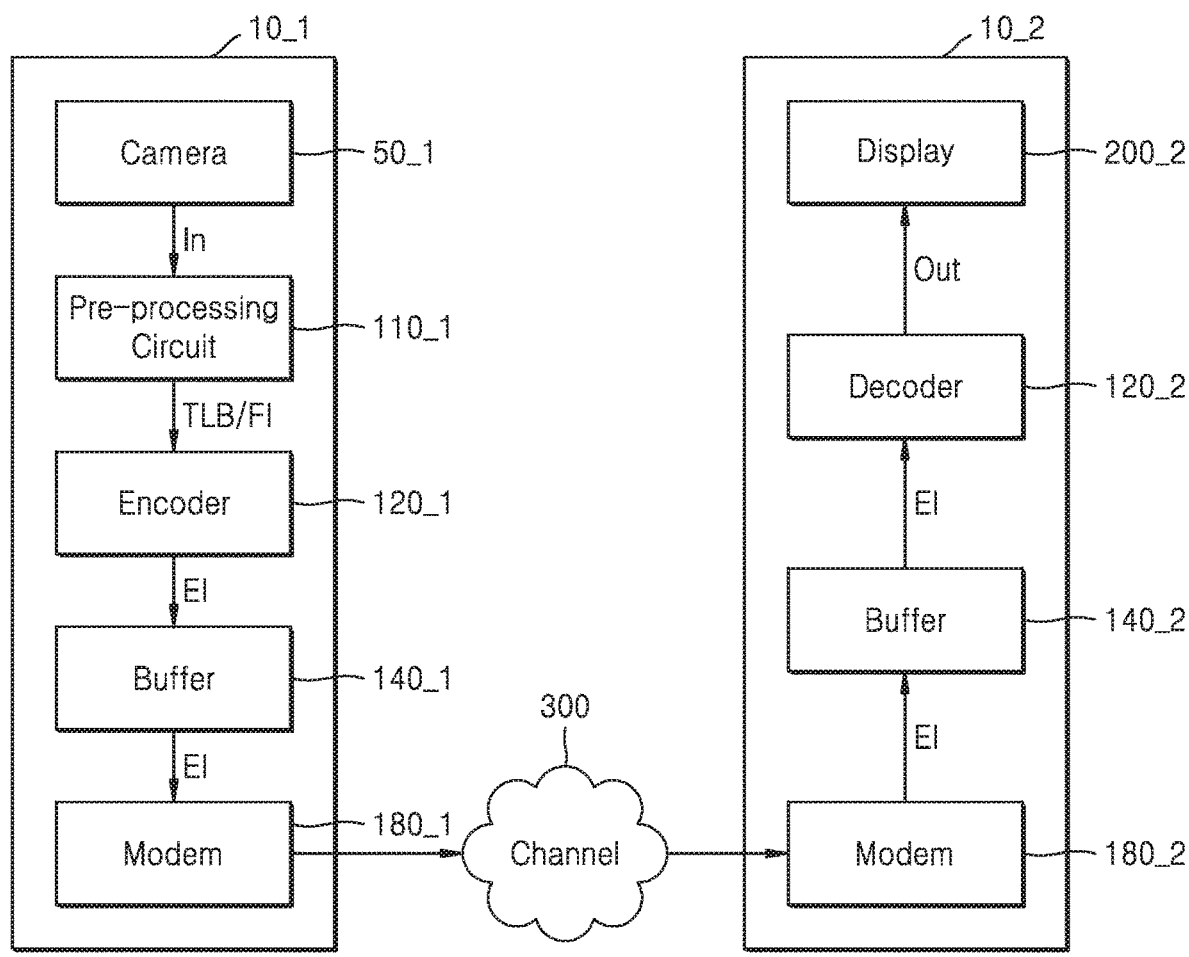
FIG. 2 is a block diagram of a video communication system according to at least some example embodiments of the inventive concepts.

FIG. 2 is a block diagram of a video communication system according to at least some example embodiments of the inventive concepts. FIG. 2 illustrates a video communication system 20. The video communication system 20 of FIG. 2 may include the video processing system 10 of FIG. 1.

Referring to FIG. 2, the video communication system 20 may include a first video processing system 10_1 and a second video processing system 10_2 that are capable of communicating with each other a via channel 300. The video communication system 20 may refer to a system for supporting video data communications.

The structure and operation of each of the first video processing system 10_1 and the second video processing system 10_2 may be substantially the same or similar. The first video processing system 10_1 may include a camera 50_1, a pre-processing circuit 110_1, an encoder 120_1, a buffer 140_1, and a modem 180_1. The first video processing system 10_1 may encode the data IN received from the camera 50_1 and transmit the encoded data EI to the second video processing system 10_2 via the channel 300.

The camera 50_1, the pre-processing circuit 110_1, the encoder 120_1, the buffer 140_1, and the modem 180_1 may be that same or, alternatively, substantially the same as the camera 50, the pre-processing circuit 110, the encoder 120, the first memory 140, and the modem 180, respectively.

The second video processing system 10_2 may receive the encoded data EI transmitted from the first video processing system 10_1 through the channel 300. The second video processing system 10_2 may include a display 200_2, a decoder 120_2, a buffer 140_2, and a modem 180_2.

The modem 180_2 may transmit the encoded data EI transmitted from the first video processing system 10_1 to the buffer 140_2. The modem 180_2 may be the same or, alternatively, substantially the same as the modem 180 of FIG. 1. The buffer 140_2 may receive the encoded data EI from the modem 180_2 and may transmit the encoded data EI to the decoder 120_2. The buffer 140_2 may be the same or, alternatively, substantially the same as the first memory 140 of FIG. 1. The decoder 120_2 may receive the encoded data EI and may decode the encoded data EI. The display 200_2 may display the data decoded by the decoder 120_2. The display 200_2 may be the same or, alternatively, substantially the same as the display 200 of FIG. 1.

The first video processing system 10_1 and the second video processing system 10_2 may perform bidirectional communication through the channel 300. According to example embodiments, the channel 300 may support, for example, Wi-Fi, WIBRO, 3G wireless communications, LTE, LTE-A, or broadband LTE-A.

Figure 3:
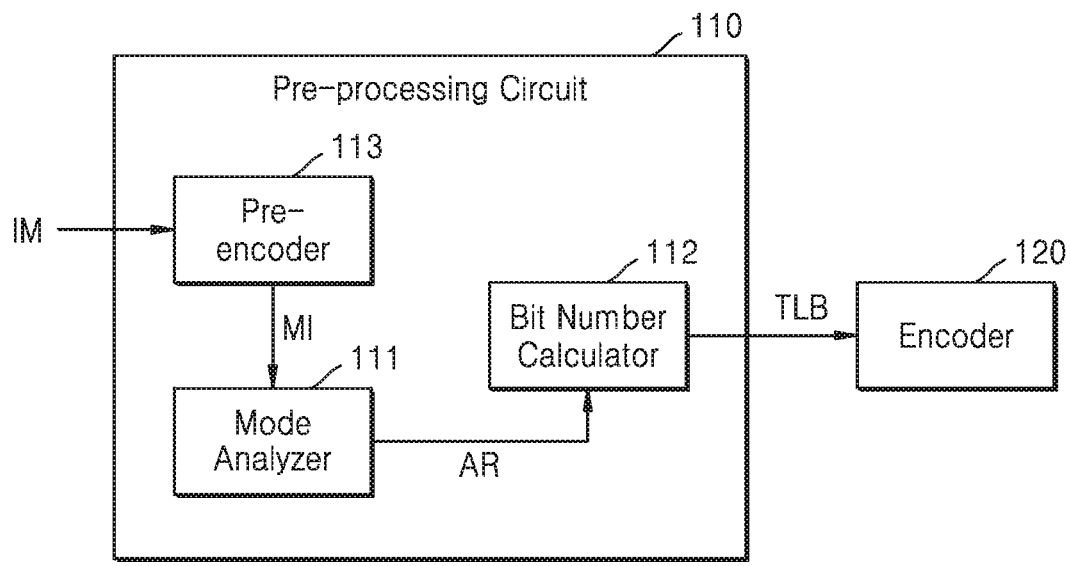
FIG. 3 is a block diagram of a video processing device according to at least some example embodiments of the inventive concepts.

FIG. 3 is a block diagram of a video processing device according to at least some example embodiments of the inventive concepts. In FIGS. 1 and 3, like reference numerals denote like elements, and therefore, duplicate descriptions will not be given herein.

Referring to FIG. 3, a video processing device 30 may include the pre-processing circuit 110 and the encoder 120. Since descriptions of the pre-processing circuit 110 and the encoder 120 are already described with reference to FIG. 1 above, repeated descriptions thereof will not be given herein. The pre-processing circuit 110 may include a mode analyzer 111, a bit number calculator 112, and a pre-encoder 113, each of which may be embodied by circuits or circuitry, program code executed by a processor (e.g., the CPU 130), or a combination of circuits or circuitry and program code executed by the processor. For example, according to at least some example embodiments of the inventive concepts, the mode analyzer 111, bit number calculator 112, and pre-encoder 113 may be referred to as a mode analyzer circuit, bit number calculator circuit, and pre-encoder circuit, respectively. The mode analyzer 111, bit number calculator 112, and pre-encoder 113 shown in FIG. 3 as being included in the pre-processing circuit 110 may also be located as a separate block outside the pre-processing circuit 110. In addition, the mode analyzer 111, the bit number calculator 112, and the pre-encoder 113 may be implemented as either a hardware block or a software block.

The pre-encoder 113 may pre-encode the first data IM containing image information about an object from the camera 50. According to at least some example embodiments of the inventive concepts, pre-encoding may be performed on past or future N (N is an integer equal to or greater than 2) frames, a group of pictures (GOP) of a target frame, or a target GOP to extract mode information MI of a frame or a GOP to be encoded. According to at least some example embodiments of the inventive concepts, the pre-encoder 113 may perform encoding to extract only mode information MI instead of encoding all of the N frames. As used herein, the term "pre-encode" refers to encoding past or future N frames only to extract the type of prediction. For example, according to at least some example embodiments of the inventive concepts the pre-encoder 113 may pre-encode N frames only to find out a motion vector of the N frames, and to determine a type of prediction of each of the N frames. Further, based on the type of prediction, the pre-encoder 113 may get the mode information MI, which identifies modes of each of the N frames. The mode information MI may identify the mode of a frame as one of an intra mode, an inter mode and a skip mode. For example, according to at least some example embodiments of the inventive concepts, the pre-encoder 113 may be configured to pre-encode neighboring frames to extract the mode information before the neighboring frames are encoded by the encoder 120.

Hereinafter, although FIG. 3 illustrates only the case where the video processing device 30 according to at least some example embodiments of the inventive concepts performs encoding for a frame, it should be understood that at least some example embodiments of the inventive concepts may also be applied to a GOP. The pre-encoder 113 may encode past or future N frames and output mode information MI about the N frames to the mode analyzer 111.

The mode information MI may include information about an intra mode, an inter mode, and a skip mode depending on characteristics of a frame. Image prediction may be used for encoding, and image prediction encoding may include intra-prediction and inter-prediction. The intra-prediction may be a prediction method based on a correlation of adjacent pixels in a single frame, and the inter-prediction may be a method of predicting an area similar to data encoded from a neighboring frame through motion prediction and compensation. As used herein, "neighboring frames" are frames that are located close to each other or, alternatively, next to each other, temporally. For example, frames that are temporally neighboring a target frame may be at least one of frames before or after the target frame in terms of a processing sequence of the frames. Since a motion vector of a block may have a close correlation with a motion vector of an adjacent block, the amount of bits generated at the time of encoding may be reduced by predicting a motion vector of a current block from the adjacent block and by encoding only a difference motion vector which is a difference between a motion vector of a current block and a predicted motion vector. In the present disclosure, encoding using the intra-prediction may be referred to as an intra mode, and encoding using the inter-prediction may be referred to as an inter mode. As used herein, "adjacent blocks" are frames that are located close to each other or, alternatively, next to each other, spatially.

Also, a skip mode is a mode selected when a motion vector of a macroblock is the same as a predicted motion vector predicted by using a motion vector of an adjacent block, and a prediction error is sufficiently small. When the skip mode is selected as a prediction mode of the macroblock, the encoded macroblock transmits only skip mode information and does not transmit residual data. A decoder may restore the macroblock encoded by the skip mode by performing motion compensation on the same by using the predicted motion vector predicted by the adjacent block.

The mode analyzer 111 may receive the mode information MI of the past or future N frames of the target frame and output a mode analysis result AR of the mode information MI to the bit number calculator 112. The mode analysis result AR may indicate the frequency of occurrence of modes of the N frames. According to at least one example embodiment of the inventive concepts, the mode analysis result AR may indicate a value obtained by dividing the number of occurrences of the intra mode by the number of occurrences of all modes or a value obtained by dividing the number of occurrences of the skip mode by the number of occurrences of all modes. According to at least another example embodiment of the inventive concepts, the mode analysis result AR may indicate both a value obtained by dividing the number of occurrences of the intra mode by the number of occurrences of all modes and a value obtained by dividing the number of occurrences of the skip mode by the number of occurrences of all modes. For example, if a prediction unit is a frame, a value obtained by dividing the number of intra mode frames or the number of skip mode frames by the total number of frames may be the mode analysis result AR. Also, if the prediction unit is a block, a value obtained by dividing the number of intra mode blocks or the number of skip mode blocks by the total number of blocks may be the mode analysis result AR.

The bit number calculator 112 may receive the mode analysis result AR. The bit number calculator 112 may calculate the target layer bit number TLB by using the received mode analysis result AR and output the target layer bit number TLB to the encoder 120. According to at least one example embodiment of the inventive concepts, the bit number calculator 112 may find a layer bit ratio by using a bit lookup table and the mode analysis result AR, and may calculate the target layer bit number TLB by using the layer bit ratio and a bitrate. Detailed descriptions thereof will be described later below in FIGS. 7 through 10.

The encoder 120 may perform encoding by using different bits for each layer corresponding to the target layer bit number TLB. Detailed descriptions thereof will be described later below in FIG. 6.

Figure 4:
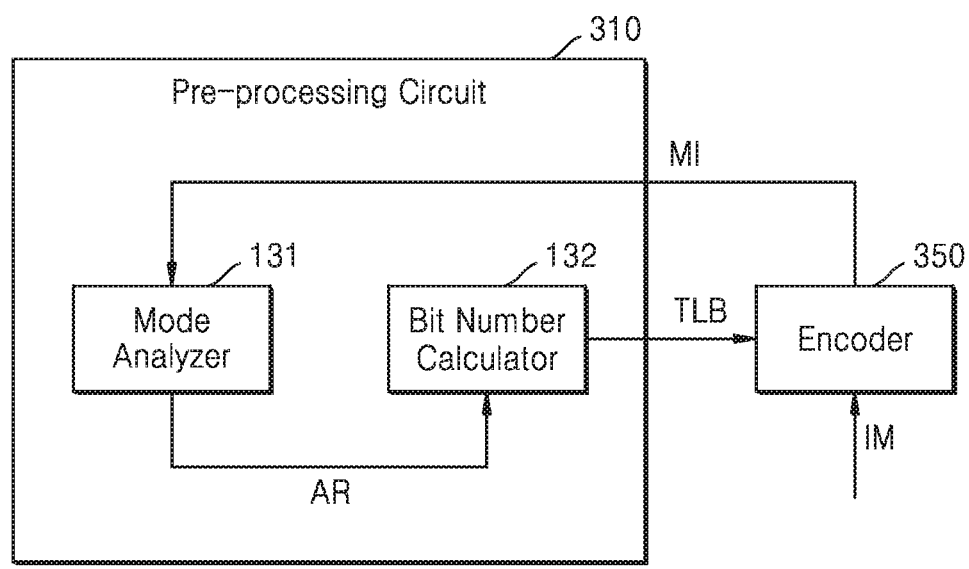
FIG. 4 is a block diagram of a video processing device according to at least some example embodiments of the inventive concepts.

FIG. 4 is a block diagram of a video processing device according to at least some example embodiments of the inventive concepts. In FIG. 4, like reference numerals to those in FIGS. 1 and 3 denote like elements, and therefore, duplicate descriptions will not be given herein.

Referring to FIG. 4, a video processing unit 40 may include a pre-processing circuit 310 and an encoder 350, and the pre-processing circuit 310 may include a mode analyzer 131 and a bit number calculator 132. The mode analyzer 131 may be substantially the same as or similar to the mode analyzer 111 of FIG. 3 and the bit number calculator 132 may be substantially the same or similar to the bit number calculator 132 of FIG. 3.

The encoder 350 may receive the first data IM containing image information of an object from the camera 50 and pre-encode the same. In more detail, the encoder 350 may pre-encode past or future N (N is an integer equal to or greater than 2) frames of a target frame to be encoded. The encoder 350 may output mode information MI for the N frames generated as a result of the pre-encoding to the mode analyzer 131. In other words, the encoder 350 may function as the pre-encoder 113 of FIG. 3. According to at least some example embodiments of the inventive concepts, the encoder 350 may perform encoding to extract only the mode information MI instead of encoding all of the N frames.

Figure 5:
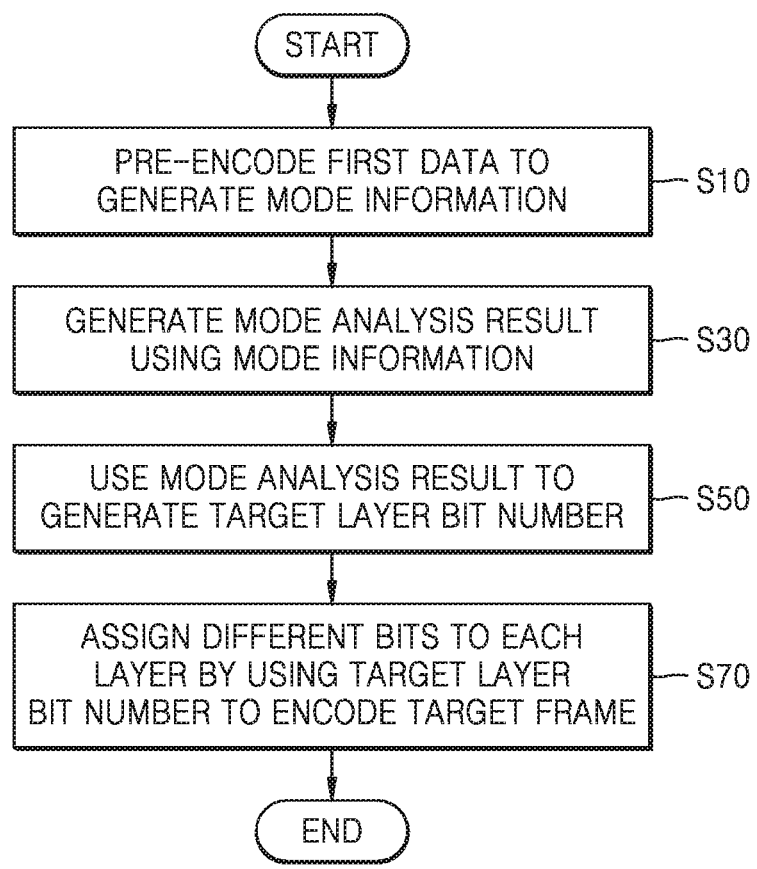
FIG. 5 is a flowchart of an operation of a video processing device according to at least some example embodiments of the inventive concepts.

FIG. 5 is a flowchart of an operation of a video processing device according to at least some example embodiments of the inventive concepts. In FIGS. 3 and 5, like reference numerals denote like elements, and therefore, duplicate descriptions will not be given herein.

Referring to FIGS. 3 and 5, in operation S10, the pre-encoder 113 may pre-encode the first data IM to generate the mode information MI. In operation S30, the mode analyzer 111 may receive the mode information MI and may generate the mode analysis result AR using the received mode information MI. In operation S50, the bit number calculator 112 may receive the mode analysis result AR and may use the received mode analysis to generate the target layer bit number TLB. In operation S70, the encoder 120 may receive the target layer bit number TLB and may assign different bits to each layer using the received target layer bit number TLB to encode a target frame. According to at least one example embodiment of the inventive concepts, the target layer bit number TLB may be used for encoding frames after the target frame.

Figure 6:
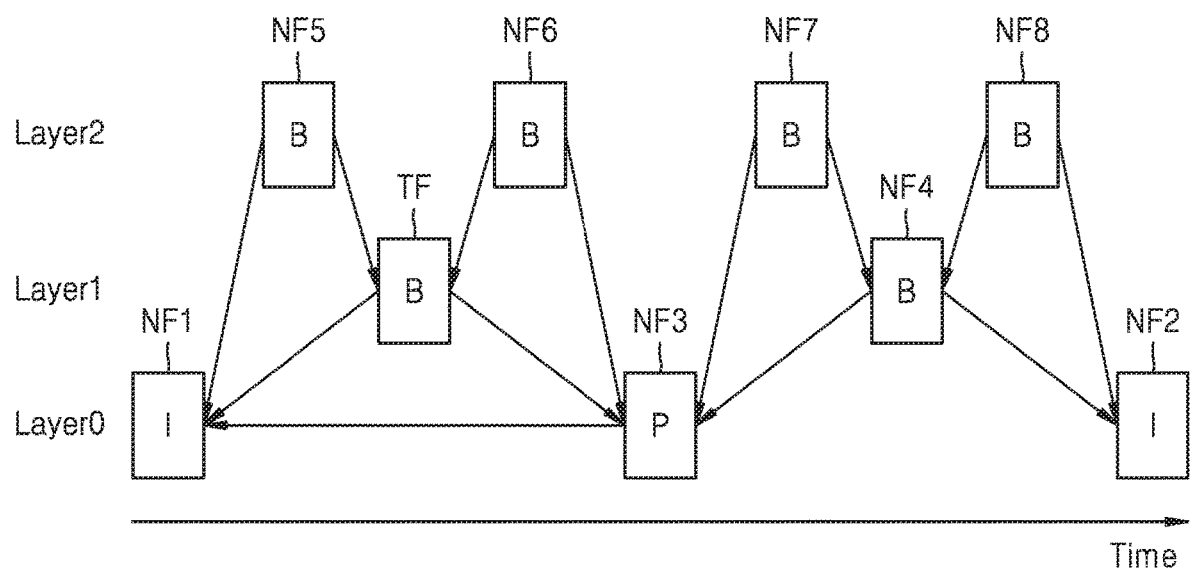
FIG. 6 is a block diagram of a multi-hierarchical structure according to at least some example embodiments of the inventive concepts.

FIG. 6 is a block diagram of a multi-hierarchical structure according to at least some example embodiments of the inventive concepts. FIG. 6 may illustrate an operation of the video processing device 30 when encoding a target frame TF. In FIGS. 3 and 6, like reference numerals denote like elements, and therefore, duplicate descriptions will not be given herein.

Referring to FIGS. 3 and 6, a horizontal axis indicates a frame order according to time, and a vertical axis indicates a layer according to a prediction type. Hereinafter, in this specification, a frame that is used to perform prediction may be referred to as a reference. According to at least some example embodiments of the inventive concepts, only a P-frame and an I-frame may be arranged in a first layer Layer 0, frames for referencing only a first layer Layer 0 may be arranged in a second layer Layer 1, and frames for referencing the second layer Layer 1 at least once may be arranged in a third layer Layer 2.

The types of prediction that a frame performs may include Intra-prediction, which is a prediction in a picture, and Inter-prediction, which is a prediction between pictures, wherein the inter-prediction may include unidirectional prediction with one reference and bidirectional prediction with two or more references. Also, depending on a prediction type, a frame may be an I-frame using only intra-prediction, a P-frame using unidirectional prediction and intra-prediction, or a B-frame using bidirectional prediction and intra-prediction. For example, in FIG. 6, a first neighboring frame NF1 and a second neighboring frame NF2 may be I-frames because the first and second neighboring frames NF1 and NF2 only perform intra-prediction without using another frame as a reference, a third neighboring frame NF3 may be a P-frame because the third neighboring frame NF3 performs intra-prediction and performs unidirectional prediction with the neighboring frame NF1 as a reference, and remaining frames TF and NF4 through NF8 may be B-frames because the remaining frames TF and NF4 through NF8 perform intra-prediction and bidirectional prediction.

The pre-encoder 113 may receive first data IM containing information about past or future neighboring frames NF1 through NF8 of the target frame TF. The pre-encoder 113 may confirm modes of the neighboring frames NF1 through NF8 through pre-encoding of the neighboring frames NF1 through NF8, respectively. Next, the pre-encoder 113 may output the confirmed result to the mode analyzer 111 as the mode information MI. The mode analyzer 111 may generate mode analysis result AR based on the mode information MI and the mode analysis result AR may indicate a ratio of a specific mode among all modes.

According to at least one example embodiment of the inventive concepts, the pre-encoder 113 may confirm whether a mode for each of the neighboring frames NF1 through NF8 is a skip mode. For example, when each of the fifth through eighth neighboring frames NF5 through NF8 is a skip mode, the pre-encoder 113 may output an indication of the modes of the neighboring frames NF1 through NF8 to the mode analyzer 111 as the mode information MI. The mode analyzer 111 may generate a value obtained by dividing the number of skip mode neighboring frames by the number of all neighboring frames (4/8=0.5 in this example) as the mode analysis result AR.

According to at least another example embodiment of the inventive concepts, the pre-encoder 113 may confirm whether a mode for each of the neighboring frames NF1 through NF8 is a skip mode or an intra mode. For example, when the pre-encoder 113 confirms that each of the fifth through eighth neighboring frames NF5 through NF8 is a skip mode and each of the first and second neighboring frames NF1 and NF2 is an intra mode, the pre-encoder 113 may output an indication of the modes of the first through eighth neighboring frames NF1 through NF8 to the mode analyzer 111 as the mode information MI. The mode analyzer 111 may generate a value obtained by dividing the number of skip mode neighboring frames by the number of all neighboring frames (4/8=0.5 in this example) and a value obtained by dividing the number of intra mode neighboring frames by the number of all neighboring frames (2/8=0.25 in this example) as the mode analysis result AR.

According to at least one example embodiment of the inventive concepts, the pre-encoder 113 may extract modes only for the P-frame and the B-frame among the neighboring frames NF1 through NF8. As described above, the I-frame may be in an intra mode because the I-frame is not generated based on inter-prediction, and the P-frame and the B-frame may be in a skip mode or an inter mode because the P-frame and the B-frame are generated based on inter-prediction. Therefore, the pre-encoder 113 may pre-encode only the P-frame and the B-frame and output the result to the mode analyzer 111.

The higher a skip mode ratio in the neighboring frames NF1 through NF8, the less the motion of an object in a picture may be, and the lower a skip mode ratio, the more the motion of an object in a picture may be. In addition, the higher an intra mode ratio in the neighboring frames NF1 through NF8, the more the motion of an object in a picture may be, and the lower an intra mode ratio, the less the motion of an object in a picture may be. According to at least one example embodiment of the inventive concepts, adaptive encoding may be possible by providing different target layer bit numbers for different layers, respectively, in consideration of the ratio of the skip mode, the inter mode, and the intra mode. The target layer bit number may be an indication of a number of bits an encoder is to use in order to perform encoding for frames of a layer corresponding to the target layer bit number. For example, according to at least one example embodiment of the inventive concepts, when the skip mode ratio is relatively high and the motion of an object in a picture is relatively low, the quality of the picture may be improved by assigning many bits to a first layer which is highly referenced by another frame. Target layer bits may be allocated to frames included in an identical layer according to a certain reference and each of the frames may be encoded based on the allocated target frame bits.

Although FIG. 6 shows eight of the neighboring frames NF1 through NF8 and three layers, it should be understood that at least some example embodiments of the inventive concepts are not limited thereto. Furthermore, according to at least one example embodiment of the inventive concepts, all the neighboring frames NF1 through NF8 may be past frames based on a target frame or may be future frames. Although a frame is used as a reference in FIG. 6, at least some example embodiments of the inventive concepts may be applied to a block unit by analogy instead of the frame according to at least one example embodiment of the inventive concepts.

Figure 7:
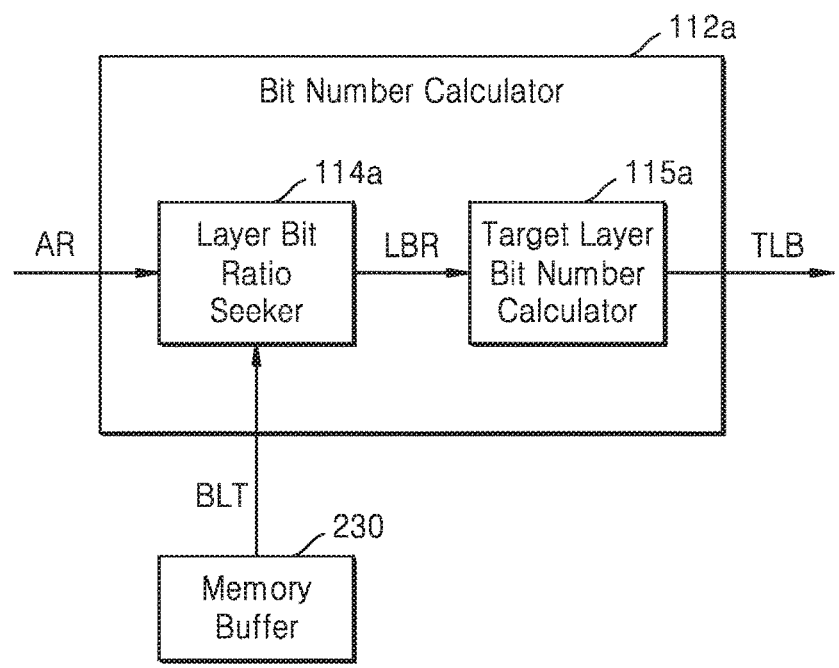
FIG. 7 is a block diagram of a bit number calculator and a memory buffer according to at least some example embodiments of the inventive concepts.

FIG. 7 is a block diagram of a bit number calculator and a memory buffer according to at least some example embodiments of the inventive concepts. In FIGS. 3 and 7, like reference numerals denote like elements, and therefore, duplicate descriptions will not be given herein.

Referring to FIGS. 1, 3 and 7, a bit number calculator 112a may include a layer bit ratio seeker 114a and a target layer bit number calculator 115a. The layer bit ratio seeker 114a may receive the mode analysis result AR from the mode analyzer 111 and receive a bit lookup table BLT from a memory buffer 230. The bit lookup table BLT may include information about a layer bit ratio LBR corresponding to the mode analysis result AR, as described later below with reference to FIGS. 9 and 10. The layer bit ratio seeker 114a may find the layer bit ratio LBR corresponding to the mode analysis result AR received from the bit lookup table BLT and may output the found layer bit ratio LBR to the target layer bit number calculator 115a. The target layer bit number calculator 115a may calculate the target layer bit number TLB using the received layer bit ratio LBR and a bitrate. According to at least one example embodiment of the inventive concepts, the target layer bit number calculator 115a may determine the target layer bit number TLB by multiplying the received layer bit ratio LBR by the bitrate. According to at least one example embodiment of the inventive concepts, the bitrate may be a desired or, alternatively, predetermined constant. According to at least some example embodiments of the inventive concepts, the constant may be stored in a memory (e.g., the first memory 140 or the second memory 220) and/or determined by the CPU 130. In addition, the bitrate may be proportional to the number of channels included in, e.g., the channel 300 of FIG. 2.

The memory buffer 230 may be a device for storing the bit lookup table BLT. According to at least one example embodiment of the inventive concepts, the memory buffer 230 may be the first memory 140 or the second memory 220, or may be a separate memory device. Also, According to at least one example embodiment of the inventive concepts, the bit look-up table BLT stored in the memory buffer 230 may be updated by the CPU 130 or the like.

Figure 8:
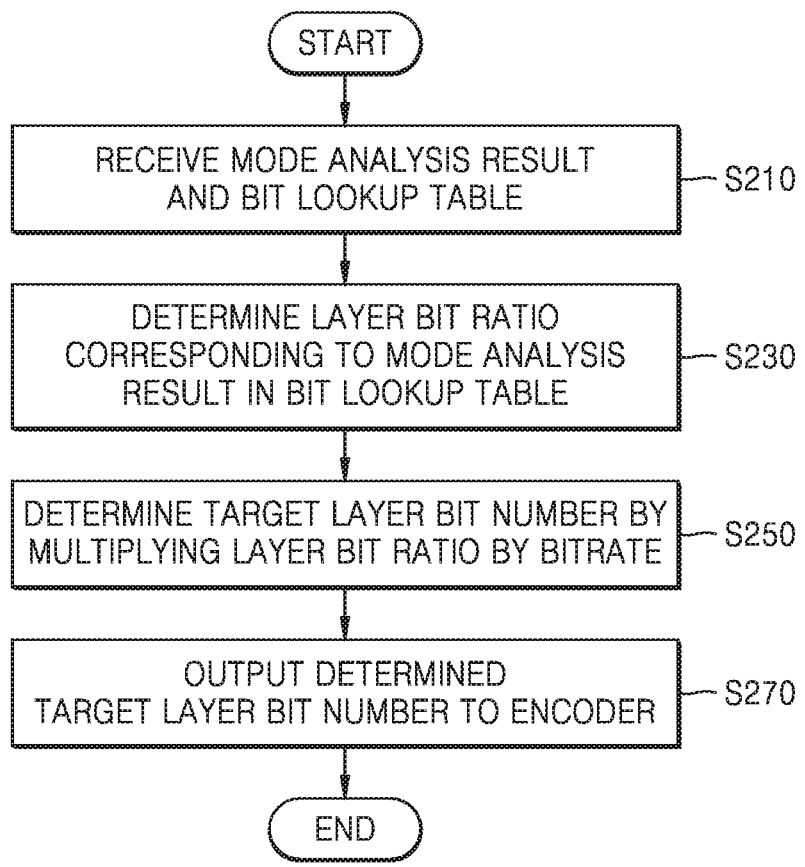
FIG. 8 is a flowchart of an operation of a bit number calculator according to at least some example embodiments of the inventive concepts.

FIG. 8 is a flowchart of an operation of a bit number calculator according to at least some example embodiments of the inventive concepts.

Referring to FIGS. 3, 7 and 8, in operation S210, the bit number calculator 112a may receive the mode analysis result AR from the mode analyzer 111 and receive the bit lookup table BLT from the memory buffer 230. In operation S230, the bit number calculator 112a may determine the layer bit ratio LBR corresponding to the mode analysis result AR in the bit lookup table BLT. In operation S250, the bit number calculator 112a may determine the target layer bit number TLB by multiplying the layer bit ratio LBR by the bitrate. In operation S270, the bit number calculator 112a may then output the determined target layer bit number TLB to the encoder 120.

Figures 10, 11:
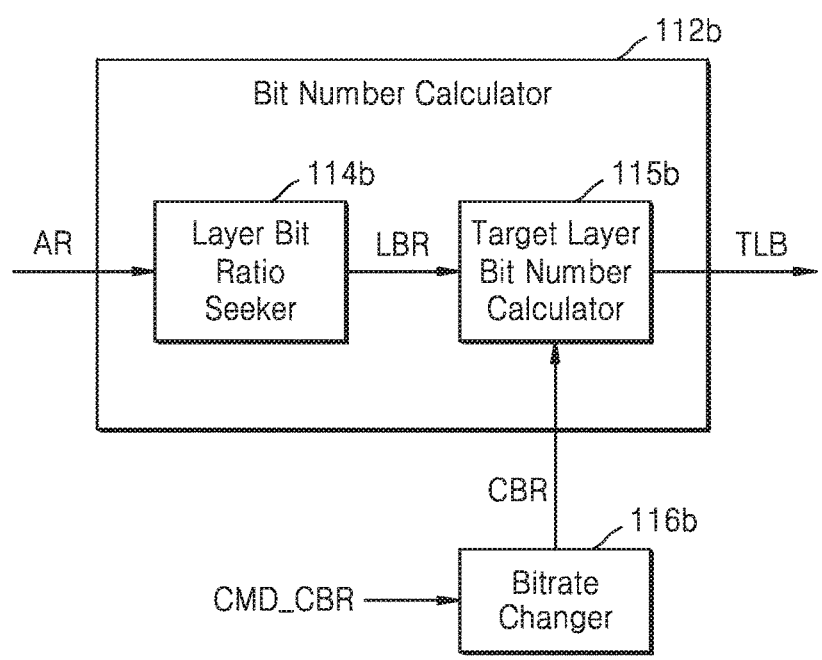

FIGS. 9 and 10 are bit lookup tables according to at least some example embodiments of the inventive concepts. FIG. 9 shows an example embodiment in which an intra mode ratio and a skip mode ratio are generated as a mode analysis result, and FIG. 10 shows an example embodiment in which only a skip mode ratio is generated as a mode analysis result. In FIGS. 7 and 9, like reference numerals denote like elements, and therefore, duplicate descriptions will not be given herein.

Referring to FIGS. 7 and 9, the layer bit ratio seeker 114a may receive an intra mode ratio R_Intra and a skip mode ratio R_Skip as the mode analysis result AR and may receive the bit lookup table BLT as shown in FIG. 9. The layer bit ratio seeker 114a may determine the layer bit ratio LBR corresponding to the intra mode ratio R_Intra and the skip mode ratio R_Skip received as the mode analysis result AR in the bit lookup table BLT.

For example, when the intra mode ratio R_Intra of the received mode analysis result AR is 10% and the skip mode ratio R_Skip is 70%, the layer bit ratio seeker 114a may determine 0.85 for a first layer bit ratio LBR0, 0.10 for a second layer bit ratio LBR1, and 0.05 for a third layer bit ratio LBR2. In addition, the layer bit ratio seeker 114a may output the layer bit ratio LBR as described above to the target layer bit number calculator 115a.

The first layer bit ratio LBR0 allocated to a first layer may be higher as the intra mode ratio R_Intra is lower and the first layer bit ratio LBR0 allocated to the first layer may be higher as the skip mode ratio R_Skip is higher. As a result, according to at least some example embodiments of the inventive concepts, the target layer bit number allocated to the first layer increases as a skip mode ratio increases. Since the first layer is more frequently referenced than the other layers, the quality of an image may be influenced more than the other layers. Therefore, since the intra mode ratio R_Intra being relatively low and/or the skip mode ratio R_Skip being relatively high may mean that the motion of a corresponding picture is relatively static, more bits may be allocated to the first layer acting as a key layer. On the other hand, since the intra mode ratio R_Intra being high and/or the skip mode ratio R_Skip being low may mean that the motion of a corresponding picture is relatively active, less bits may be allocated to the first layer acting as a key layer.

Referring to FIGS. 7 and 10, according to at least some example embodiments of the inventive concepts, the layer bit ratio seeker 114a may receive only the skip mode ratio R_Skip as the mode analysis result AR and may receive the bit lookup table BLT as shown in FIG. 9. The layer bit ratio seeker 114a may determine the layer bit ratio LBR corresponding to the skip mode ratio R_Skip received as the mode analysis result AR in the bit lookup table BLT. For example, when the skip mode ratio R_Skip of the received mode analysis result AR is 30%, the layer bit ratio seeker 114a may determine 0.75 for the first layer bit ratio LBR0, 0.15 for the second layer bit ratio LBR1, and 0.10 for the third layer bit ratio LBR2. In addition, the layer bit ratio seeker 114a may output the layer bit ratio LBR as described above to the target layer bit number calculator 115a.

The bit lookup tables BLT of FIGS. 9 and 10 are examples, and thus, it should be understood that at least some example embodiments of the inventive concepts are not limited thereto. Furthermore, although FIGS. 9 and 10 illustrate three layers of 0th to 2nd layers, at least some example embodiments of the inventive concepts are not limited thereto. Even if the number of layers is larger or smaller than 3, the bit lookup table BLT may refer to a table including information about the layer bit ratio LBR for all layers.

FIG. 11 is a block diagram of a bit number calculator and a bitrate changer according to at least some example embodiments of the inventive oncepts. In FIGS. 7 and 11, like reference numerals denote like elements, and therefore, duplicate descriptions will not be given herein.

Referring to FIGS. 7 and 11, a bit number calculator 112b may be the same as, or similar to, the bit number calculator 112a of FIG. 7. A bitrate changer 116b may receive a bitrate change command CMD_CBR. The bitrate change command CMD_CBR may also be referred to, herein, as a bitrate change signal. The bitrate changer 116b may output a changed bitrate CBR, which is changed according to the received bitrate change command CMD_CBR, to a target layer bit number calculator 115b. The target layer bit number calculator 115b may output the target layer bit number TLB by multiplying the changed bitrate CBR by the layer bit ratio LBR received from a layer bit ratio seeker 114b. For example, the bitrate changer 116b may change an existing bitrate to the changed bitrate CBR, and the target layer bit number calculator 115b may cause the changed bitrate CBR to generate the target layer bit number TLB. According to at least some example embodiments of the inventive concepts, the bitrate changer may 116b be implemented as a circuit or circuitry included in the bit number calculator 112b and/or the video processing device 30. According to at least on example embodiment of the inventive concepts, the bitrate change command CMD_CBR received by the bitrate changer may 116b may be generated by the CPU 130. According to at least some example embodiments of the inventive concepts, the bitrate changer 116b may be referred to as a bitrate changer circuit.

Figure 12:
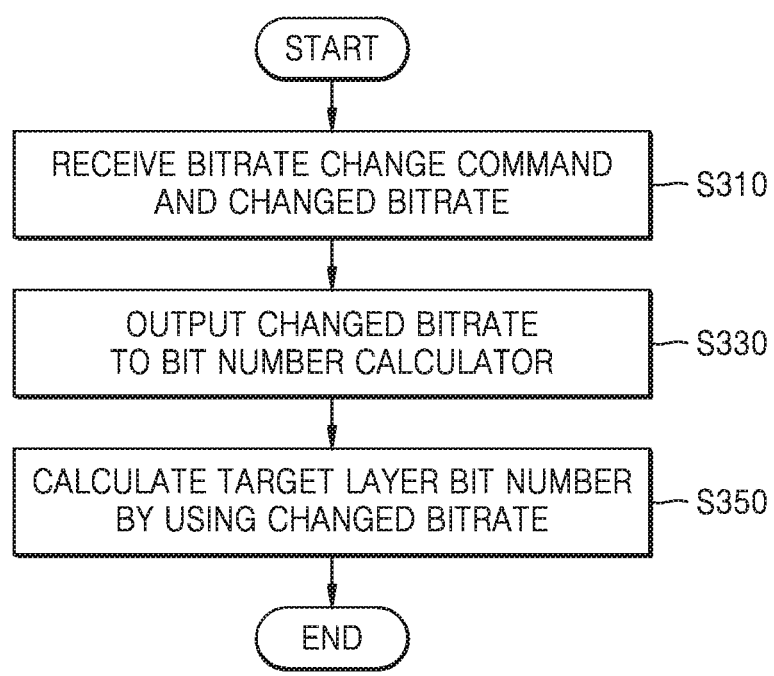
FIG. 12 is a flowchart of an operation of a bitrate changer and a bit number calculator according to at least some example embodiments of the inventive concepts.

FIG. 12 is a flowchart of an operation of a bitrate changer and a bit number calculator according to at least some example embodiments of the inventive concepts.

Referring to FIGS. 11 and 12, in operation S310, the bitrate changer 116b may receive the bitrate change command CMD_CBR and the changed bitrate CBR. In operation S330, the bitrate changer 116b may output the changed bitrate CBR to the bit number calculator 112b, and in operation S350, the bit number calculator 112b may calculate the target layer bit number TLB using the changed bitrate CBR.

Figure 13:
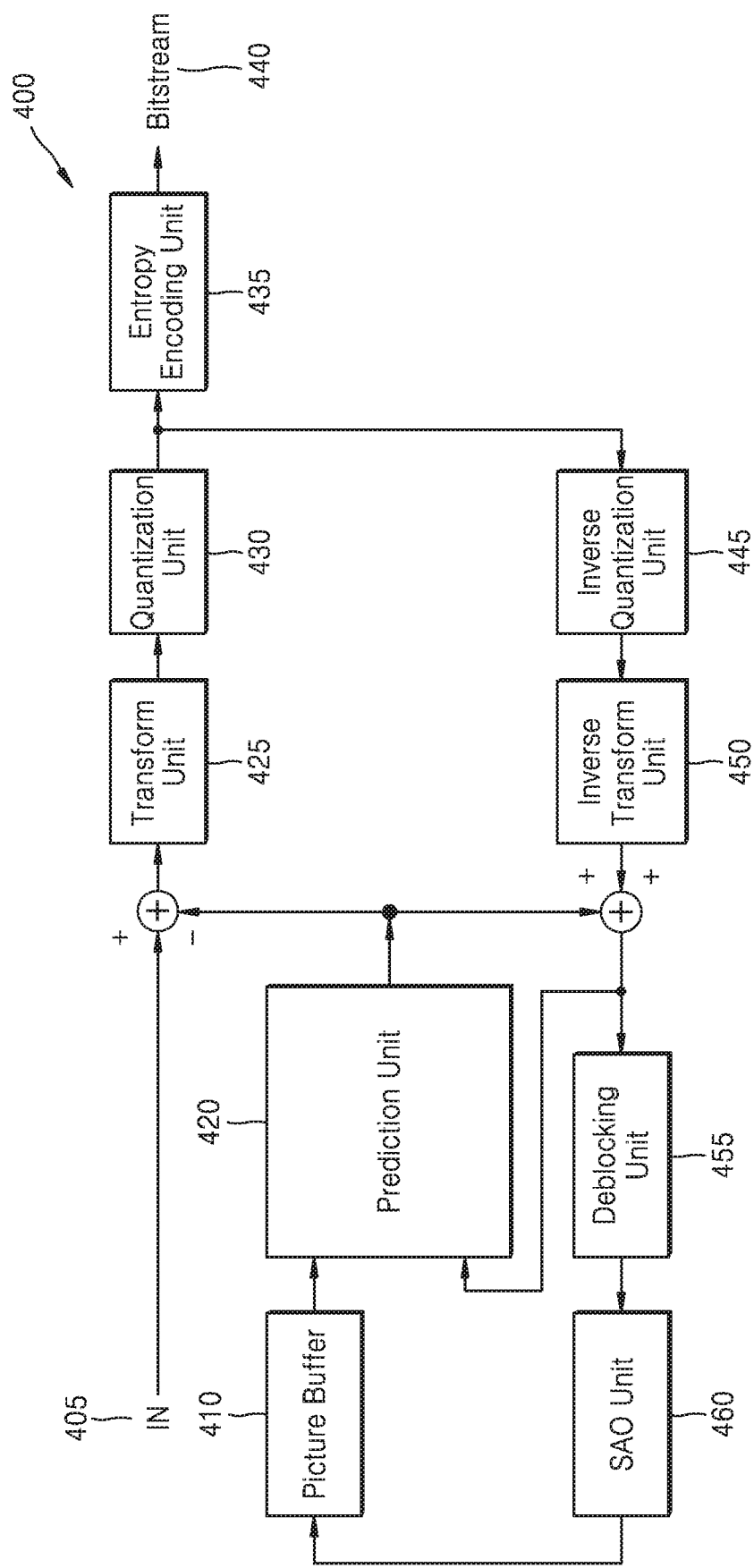
FIG. 13 is a block diagram of an encoder according to at least some example embodiments of the inventive concepts.

FIG. 13 is a block diagram of an encoder according to at least some example embodiments of the inventive concepts.

Referring to FIG. 13, an encoder 400 may perform operations that are required to encode image data. A prediction unit 420 may perform intra-prediction on an encoding unit of an intra mode in a current image 405 for each prediction unit and may perform inter-prediction using a reference image obtained from the current image 405 and a restored picture buffer 410 on an encoding unit of an inter mode for each prediction unit.

The current image 405 may be divided into units each having a size of a desired or, alternatively, maximum encoding unit, and then the divided units may be encoded sequentially. Here, encoding may be performed on an encoding unit in which the desired or, alternatively, maximum encoding unit is divided into a tree structure. Residue data may be generated by subtracting prediction data for an encoding unit of each mode output from the prediction unit 420 from data for an encoding unit to be encoded of the current image 405. The residue data may be output as a transform coefficient quantized for each transform unit through the transform unit 425 and the quantization unit 430. The quantized transform coefficients may be restored into residue data in a spatial domain through an inverse quantization unit 445 and an inverse transform unit 450. The residue data of the restored spatial domain may be restored into spatial domain data for the encoding unit of the current image 405 by adding the prediction data for the encoding unit of each mode output from the prediction unit 420. The restored spatial domain data may be generated as a restored image through a deblocking unit 455 and a SAO unit 460. The generated restored image may be stored in the restored picture buffer 410. The restored images stored in the restored picture buffer 410 may be used as reference images for inter-prediction of other images. The transform coefficients quantized by the transform unit 425 and the quantization unit 430 may be output to a bitstream 440 via an entropy encoding unit 435. Here, according to at least some example embodiments of the inventive concepts, the encoder 400 may perform encoding based on the target layer bit number of FIG. 1.

The picture buffer 410, the prediction unit 420, the transform unit 425, the quantization unit 430, the entropy encoding unit 435, the inverse quantization unit 445, the inverse transform unit 450, the deblocking unit 455, and the SAO unit 460, which are components of the encoder 400, may perform operations based on each encoding unit among the encoding units according to the tree structure for each desired or, alternatively, maximum encoding unit.

Figure 14:
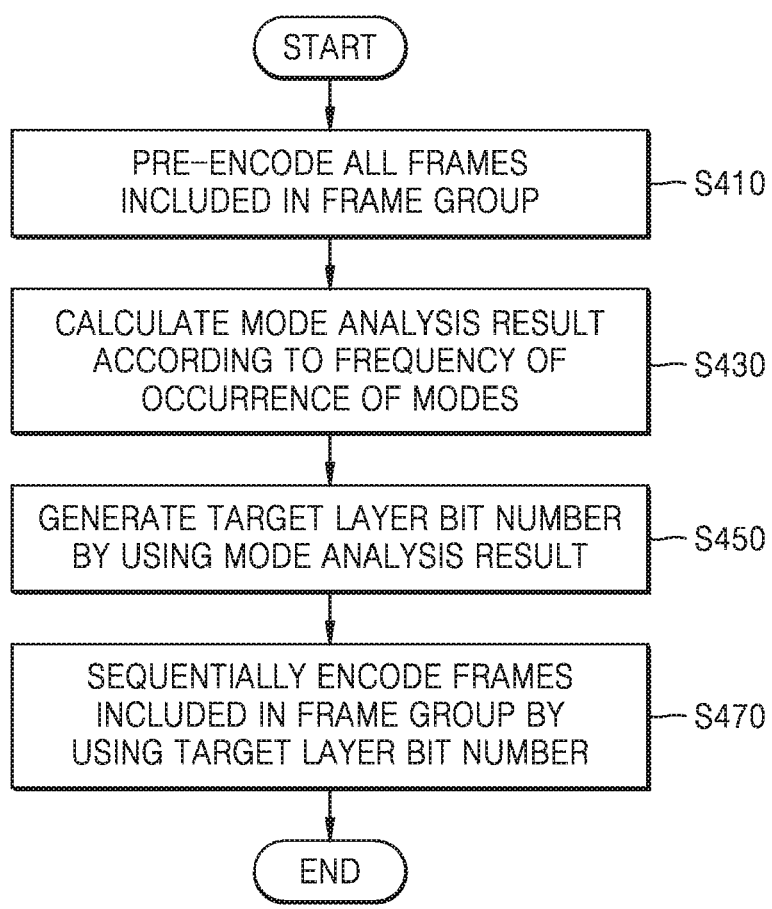
FIG. 14 is a flowchart of an operation of a video processing device according to at least some example embodiments of the inventive concepts.

FIG. 14 is a flowchart of an operation of a video processing device according to at least some example embodiments of the inventive concepts.

Referring to FIGS. 3 and 14, in operation S410, the pre-encoder 113 may pre-encode all frames included in a frame group. According to at least one example embodiment of the inventive concepts, a frame group may include all frames from any I-frame to just before the next I-frame in a temporal order (e.g., NF1, NF3 through NF8 and TF of FIG. 6). In operation S430, the mode analyzer 111 may receive the mode information MI for one frame group from the pre-encoder 113 and calculate the mode analysis result AR according to the frequency of occurrence of modes, and may output the calculated mode analysis result AR to the bit number calculator 112. In operation S450, the bit number calculator 112 may generate a target layer bit number using the received mode analysis result AR. For example, according to at least one example embodiment of the inventive concepts, the number calculator 112 may generate the target layer bit number based on a determined frequency of the skip mode (or a skip mode ratio) indicated by the mode analysis result AR. However, according to at least some example embodiments, the number calculator 112 may generate the target layer bit number based on a determined frequency or ratio of a mode other than the skip mode, or based on the determined frequencies of combinations of modes which may or may not include the skip mode. In operation S470, the encoder 120 may sequentially encode the frames included in the frame group using a target layer bit number received for each of layers. Accordingly, frames included in each layer may be encoded based on different target layer bit numbers.

Figure 15:
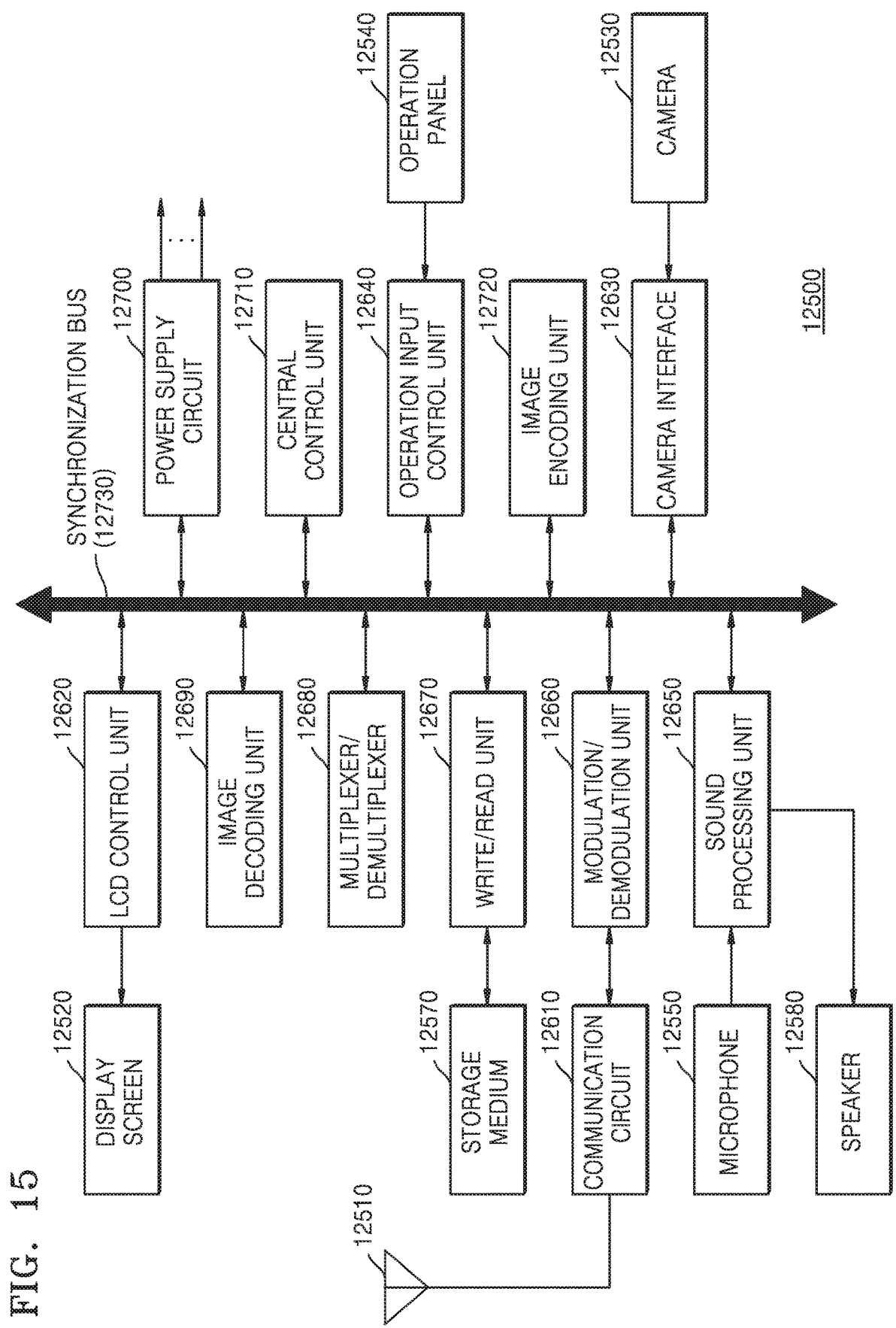
FIG. 15 is a view of an internal structure of a mobile phone according to at least some example embodiments of the inventive concepts.

FIG. 15 is a view of an internal structure of a mobile phone according to at least some example embodiments of the inventive concepts.

In order to systematically control each part of a mobile phone 12500 including a display screen 12520 and an operation panel 12540, a power supply circuit 12700, an operation input control unit 12640, an image encoding unit 12720, a camera interface 12630, an LCD control unit 12620, an image decoding unit 12690, a multiplexer/demultiplexer 12680, a write/read unit 12670, a modulation/demodulation unit 12660, and a sound processing unit 12650 may be connected to a central control unit 12710 via a synchronization bus 12730.

When a user operates a power button to set power supply from a power-off state to a power-on state, the power supply circuit 12700 may supply power to each part of the mobile phone 12500 from a battery pack, thereby setting the mobile phone 12500 to an operation mode.

The central control unit 12710 may include a CPU, ROM, and RAM. In the process of transmitting communication data to the outside of the mobile phone 12500, a digital signal may be generated in the mobile phone 12500 under the control of the central control unit 12710. For example, a digital sound signal is generated in the sound processing unit 12650 and a digital image signal is generated in the image encoding unit 12720, and text data of an message may be generated through the operation panel 12540 and the operation input control unit 12640. When a digital signal is transmitted to the modulation/demodulation unit 12660 under the control of the central control unit 12710, the modulation/demodulation unit 12660 may modulate a frequency band of the digital signal, and a communication circuit 12610 may perform digital-analog (D/A) conversion and frequency conversion on the band-modulated digital sound signal. A transmission signal output from the communication circuit 12610 may be transmitted to a voice communication base station or a radio base station 12000 through an antenna 12510.

In order to transmit image data in a data communication mode, image data photographed by a camera 12530 may be provided to the image encoding unit 12720 through the camera interface 12630. The image data photographed by the camera 12530 may be displayed directly on the display screen 12520 through the camera interface 12630 and the LCD control unit 12620. The image encoding unit 12720 may correspond to the video processing device of FIGS. 1 through 15. The image encoding unit 12720 may encode the image data provided from the camera 12530 according to the video encoding method according to at least some example embodiments of the inventive concepts and convert the encoded image data into compressed encoded image data, and may output the encoded image data to the multiplexer/demultiplexer 12680. A sound signal obtained by a microphone 12550 of the mobile phone 12500 during the recording of the camera 12530 may also be converted into digital sound data via the sound processing unit 12650, and the digital sound data may be transmitted to the multiplexer/demultiplexer 12680.

The multiplexer/demultiplexer 12680 may multiplex encoded image data provided from the image encoding unit 12720 together with the sound data provided from the sound processing unit 12650, and the multiplexed data may be converted into a transmission signal through the modulation/demodulation unit 12660 and the communication circuit 12610 and output via the antenna 12510.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A video processing device configured to encode frames divided into a plurality of layers according to a prediction type and comprising:
   a pre-processing circuit configured to,
      generate a mode analysis result by analyzing mode information for each of N neighboring frames neighboring a target frame, the mode analysis result indicating at least one mode ratio of the neighboring frames, the at least one mode ratio being an intra mode ratio or a skip mode ratio, the intra mode ratio being a fraction of modes of the neighboring frames that are an intra mode, the skip mode ratio being a fraction of the modes of the neighboring frames that are a skip mode, and determine target layer bit numbers allocated to each of the plurality of layers based on the mode analysis result, N being an integer equal to or greater than 2; and a first encoder configured to encode the target frame according to the determined target layer bit numbers.

2. The video processing device of claim 1, wherein the neighboring frames are at least one of frames before or after the target frame in terms of a processing sequence of the frames.

3. The video processing device of claim 1, wherein the first encoder is configured to encode each of the neighboring frames using at least one of an intra mode, an inter mode, and a skip mode, and the pre-processing circuit comprises a pre-encoder configured to pre-encode the neighboring frames to extract the mode information before the neighboring frames are encoded by the first encoder.

4. The video processing device of claim 3, wherein the pre-processing circuit further comprises:

a mode analyzer circuit configured to analyze the mode information and determine the mode analysis result; and a bit number calculator circuit configured to receive the mode analysis result from the mode analyzer circuit and determine the target layer bit numbers based on the mode analysis result and a bit lookup table, the bit lookup table including a plurality of entries, each entry indicating one or more bit ratios corresponding, respectively, to one or more layers from among the plurality of layers, and the determining of the target layer bit numbers including selecting, based on the at least one indicated mode ratio, an entry corresponding to the at least one indicated mode ratio, from among the plurality of entries included in the bit lookup table, and determining the target layer bit numbers based on the one or more bit ratios included in the selected entry.

5. The video processing device of claim 4, further comprising:

a memory buffer configured to store the bit lookup table.

6. The video processing device of claim 4, wherein the bit number calculator circuit is configured to determine the target layer bit numbers based on a bitrate and the one or more bit ratios included in the selected entry.

7. The video processing device of claim 6, further comprising:

a bitrate changer circuit configured to change the bitrate based on a bitrate change signal.

8. The video processing device of claim 3, wherein the neighboring frames include at least an I-frame, a P-frame, and a B-frame, and the pre-processing circuit is configured to pre-encode only the frames, from among the neighboring frames, that are not an I-frame.

9. The video processing device of claim 3, wherein, the mode information identifies modes of the neighboring frames, the modes of the neighboring frames each being one of an intra mode, an inter mode and a skip mode.

10. The video processing device of claim 3, wherein, the plurality of layers includes a first layer that is a most frequently referred to layer from among the plurality of layers, and the pre-processing circuit is configured such that the target layer bit number allocated to the first layer increases as a skip mode ratio according to the pre-encoding result increases.

11. A video processing device configured to encode frames divided into a plurality of layers according to a prediction type and comprising:

a pre-processing circuit configured to,
generate a mode analysis result by analyzing mode information for a frame group comprising M frames from among a plurality of frames, the mode analysis result indicating at least one mode ratio of the M frames, the at least one mode ratio being an intra mode ratio or a skip mode ratio, the intra mode ratio being a fraction of modes of the M frames that are an intra mode, the skip mode ratio being a fraction of the modes of the M frames that are a skip mode, and determine target layer bit numbers allocated to each of the plurality of layers based on the mode analysis result, M being an integer equal to or greater than 2; and a first encoder configured to sequentially encode the frame group according to the determined target layer bit numbers.

12. The video processing device of claim 11, wherein the frame group includes at least one I-frame from among the plurality of frames, and the frame group includes all frames from the I-frame to another frame before the next I-frame in a temporal order, from among the plurality of frames.

13. The video processing device of claim 11, wherein the first encoder is configured to encode each of the M frames using at least one of an intra mode, an inter mode, and a skip mode, and the pre-processing circuit is configured to generate at least one of an intra mode ratio and a skip mode ratio of the M frames as the mode analysis result.

14. The video processing device of claim 11, wherein the pre-processing circuit is configured to find a layer bit ratio in a bit lookup table based on the mode analysis result, and determine the target layer bit numbers by multiplying the layer bit ratio by a bitrate.

15. The video processing device of claim 11, wherein the first encoder is configured to encode each of the M frames using at least one of an intra mode, an inter mode, and a skip mode, the plurality of layers includes a first layer that is a most frequently referred to layer from the plurality of layers, and the pre-processing circuit is configured such that the target layer bit number allocated to the first layer increases as a skip mode ratio according to the pre-encoding result increases.

16. A video encoder comprising:

a pre-processing circuit configured to,
determine a plurality of encoding modes corresponding to a plurality of frames, respectively, the plurality of frames temporally neighboring a target frame,
generate a mode analysis result based on the determined plurality of encoding modes, the mode analysis result indicating at least one mode ratio of the plurality of temporally neighboring frames, the at least one mode ratio being an intra mode ratio or a skip mode ratio, the intra mode ratio being a fraction of the plurality of encoding modes that are an intra mode, the skip mode ratio being a fraction of the plurality of encoding modes that are a skip mode, and determine target layer bit numbers for each of a plurality of layers into which the plurality of temporally neighboring frames are divided, based on the mode analysis result; and an encoder configured to encode the target frame based on the determined target layer bit numbers.

17. The video encoder of claim 16, wherein each of the determined plurality of encoding modes is one of an intra mode, an inter mode, and a skip mode.

18. The video encoder of claim 17, wherein the pre-processing circuit is further configured to, determine a frequency of the skip mode among the determined plurality of encoding modes, and determine the target layer bit numbers based on the determined frequencies.

19. The video encoder of claim 16, wherein the pre-processing circuit is configured to, find a layer bit ratio in a bit lookup table based on the mode analysis result, and determine the target layer bit numbers by multiplying the layer bit ratio by a bitrate.

20. The video encoder of claim 16, wherein the target layer bit numbers indicate numbers of bits for the encoder to use to encode the frames of the layers, from among the plurality of layers, for which the target layer bit numbers were determined.

* * * * *